United States Patent
Maaniitty

(10) Patent No.: US 8,767,770 B2
(45) Date of Patent: Jul. 1, 2014

(54) SELECTING A DATA TRANSFER METHOD

(75) Inventor: Jussi Maaniitty, Viiala (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 13/411,998

(22) Filed: Mar. 5, 2012

(65) Prior Publication Data

US 2012/0165051 A1 Jun. 28, 2012

Related U.S. Application Data

(63) Continuation of application No. 11/216,249, filed on Nov. 21, 2005, now Pat. No. 8,149,724, which is a continuation of application No. PCT/FI2004/000484, filed on Aug. 17, 2004.

(30) Foreign Application Priority Data

Aug. 18, 2003 (FI) ..................................... 20031165

(51) Int. Cl.
*H04J 3/22* (2006.01)

(52) U.S. Cl.
USPC ......................................................... 370/465

(58) Field of Classification Search
USPC ......... 370/252, 254, 419, 420, 431, 463–467, 370/469; 455/432.2, 432.3
See application file for complete search history.

(56) References Cited

U.S. PATENT DOCUMENTS

| | | |
|---|---|---|
| 5,142,528 A | 8/1992 | Kobayashi et al. |
| 5,414,444 A | 5/1995 | Britz |
| 5,630,060 A | 5/1997 | Tang et al. |
| 5,631,637 A | 5/1997 | Ueda |
| 5,910,951 A | 6/1999 | Pearce et al. |
| 6,002,689 A | 12/1999 | Christie et al. |
| 6,009,336 A | 12/1999 | Harris et al. |
| 6,061,502 A | 5/2000 | Ho et al. |
| 6,072,862 A | 6/2000 | Srinivasan |
| 6,177,950 B1 | 1/2001 | Robb |
| 6,333,919 B2 | 12/2001 | Gaffney |
| 6,411,990 B1 | 6/2002 | Shaffer et al. |
| 6,564,070 B1 | 5/2003 | Nagamine et al. |
| 6,633,630 B1 | 10/2003 | Owens et al. |
| 6,690,674 B1 | 2/2004 | Christie et al. |

(Continued)

FOREIGN PATENT DOCUMENTS

| | | |
|---|---|---|
| CN | 1170329 A | 1/1998 |
| CN | 1179684 A | 4/1998 |

(Continued)

OTHER PUBLICATIONS

Search Report for International Application No. PCT/FI2004/000484, mailed Dec. 15, 2004.

(Continued)

*Primary Examiner* — Kerri Rose
(74) *Attorney, Agent, or Firm* — Alston & Bird LLP

(57) ABSTRACT

The invention relates to a method for selecting a data transfer method in a telecommunication system wherein several data transfer methods exist for selection. The method comprises determining a message to be transmitted on the basis of inputs received from a user. At least one piece of property information concerning the message being entered or already entered is checked. In order to transmit the message, the data transfer method associated in predetermined selection conditions with the property information is selected.

13 Claims, 2 Drawing Sheets

(56) References Cited

U.S. PATENT DOCUMENTS

| | | | |
|---|---|---|---|
| 6,848,008 | B1 | 1/2005 | Sevanto et al. |
| 7,269,432 | B2 | 9/2007 | Gress et al. |
| 7,310,514 | B2 | 12/2007 | Shinohara |
| 7,668,535 | B2 | 2/2010 | Conneely et al. |
| 8,149,724 | B2 | 4/2012 | Maaniitty |
| 2002/0007398 | A1 | 1/2002 | Mendiola et al. |
| 2002/0132608 | A1 | 9/2002 | Shinohara |
| 2002/0152220 | A1 | 10/2002 | Kang et al. |
| 2003/0105825 | A1 | 6/2003 | Kring et al. |
| 2003/0214970 | A1 | 11/2003 | Pimentel |
| 2003/0224814 | A1 * | 12/2003 | Qu et al. ................ 455/517 |
| 2004/0203945 | A1 | 10/2004 | Qu et al. |
| 2007/0112915 | A1 * | 5/2007 | Klassen et al. ............. 709/206 |
| 2008/0020787 | A1 | 1/2008 | Lahtinen |

FOREIGN PATENT DOCUMENTS

| | | |
|---|---|---|
| CN | 1208529 A | 2/1999 |
| CN | 1224200 A | 7/1999 |
| CN | 1251716 A | 4/2000 |
| CN | 1274502 A | 11/2000 |
| CN | 1377201 A | 10/2002 |
| DE | 297 22 657 U1 | 5/1998 |
| EP | 0 912 036 A2 | 4/1999 |
| EP | 1 091 601 A2 | 4/2001 |
| EP | 1 161 109 A2 | 12/2001 |
| EP | 1 263 251 A1 | 12/2002 |
| JP | 9252393 A | 9/1997 |
| JP | 10-65780 A | 3/1998 |
| JP | 10107842 A | 4/1998 |
| JP | 11088251 A | 3/1999 |
| JP | 11113061 A | 4/1999 |
| JP | 2001292245 A | 10/2001 |
| JP | 2001313777 A | 11/2001 |
| KR | 2004/098980 A | 11/2004 |
| WO | WO-96/38762 A1 | 12/1996 |
| WO | WO 99/66746 A2 | 12/1999 |
| WO | WO-00/07357 A1 | 2/2000 |
| WO | WO 00/41369 A1 | 7/2000 |
| WO | WO 00/64110 A1 | 10/2000 |
| WO | WO 01/33782 A1 | 5/2001 |
| WO | WO 01/63946 A1 | 8/2001 |
| WO | WO 03/019959 A1 | 3/2003 |
| WO | WO 03/103319 A1 | 12/2003 |

OTHER PUBLICATIONS

International Preliminary Report on Patentability for International Application No. PCT/FI2004/000484, issued Feb. 21, 2006.
Office Action for Canadian Intellectual Property Office, Application No. 2,502,963; dated Jul. 10, 2012.
"*A Detailed Review of the SMS Transmission Model and its Application*;" Communications World Weekly, vol. 8; dated Apr. 2001.
Office Action for Japanese Application No. 2005-518222; dated Oct. 23, 2007.
Office Action for Japanese Application No. 2005-518222; dated Feb. 19, 2008.

\* cited by examiner

SELECTING A DATA TRANSFER METHOD

CROSS-REFERENCE TO RELATED APPLICATIONS

This application is a continuation of U.S. application Ser. No. 11/216,249, filed on Nov. 21, 2005, which is a continuation of International Application PCT/FI2004/000484 filed on 17 Aug. 2004, which claims priority to Finnish Application No. 20031165, filed on Aug. 18, 2003.

FIELD OF THE INVENTION

The invention relates to selecting a data transfer method in a telecommunication system.

BACKGROUND OF THE INVENTION

Existing wireless terminal devices, such as mobile stations, are provided with several different ways of transmitting messages to a telecommunication network or to another terminal device. Many terminal devices support e.g. transfer of text-form short messages (Short Message Service SMS), multimedia messages (Multimedia Messaging Service MMS) and e-mail messages. Since e.g. SMS and MMS messages enable information of different type to be transferred, each message type is provided with a unique editor of its own. When a user wishes to send a message, he or she typically first has to choose a data transfer application to be used for transferring the message. After the user has chosen the data transfer application, a message editor opens at the user interface to enable the user to enter the message using, for instance, the keypad of the terminal device. An example of such a terminal device is a Nokia Communicator wherein in a messaging view, the first thing to do is to select whether the message to be sent is an e-mail message, a short message or a fax, and, accordingly, an application-specific message editor will open.

For an unaccustomed user, however, it is not always clear as to which editor to choose to send a desired message. For example, if the user wishes to transmit modified text, he or she has to choose the MMS application (and editor) rather than the SMS application since modified text cannot be transmitted as an SMS message. Such special features and limitations of data transfer methods and the editors used therein are often unknown to users, which causes problems in transmitting messages and makes the users unsatisfied. A specific problem concerning SMS messages has been solved by the Nokia Communicator device wherein the editor detects when the length of a message entered by a user exceeds the maximum length, in which case the message is prevented from being transmitted as an SMS message. This known solution does not, however, help the user in taking into account any other limitations of the data transfer methods when choosing the data transfer method.

BRIEF DESCRIPTION OF THE INVENTION

An object of the invention is thus to provide a method and an apparatus implementing the method so as to enable the above-mentioned problems to be avoided or at least alleviated. The object of the invention is achieved by a method, a terminal device and a computer program product which are characterized by what has been disclosed in the independent claims. Some embodiments of the invention are disclosed in the dependent claims.

According to the invention, at least one piece of property information concerning a message being entered or already entered is checked. In order to transmit the message, a data transfer method associated in predetermined selection conditions with the property information is selected.

An advantage of the arrangement of the invention is that the data transfer method can be selected automatically according to one or more properties of a message. In such a case, a user does not necessarily have to know the limitations of the data transfer methods but the data transfer method suitable for transferring the message can be selected according to the predetermined selection conditions. The invention makes messages easier to transmit e.g. from a modern mobile station which supports several alternative data transfer methods.

According to an embodiment of the invention, one or more information types of information entered into and/or selected for a message are checked. The data transfer method associated in the selection conditions with the determined one or more information types is selected for transmitting the message. This embodiment enables a data transfer method to be selected which supports the transfer of the contents of a message to be transmitted.

According to another embodiment of the invention, the type of the identifier of the receiver entered or selected by the user as the receiver of the message is checked. Next, the data transfer method associated with the type of the identifier of the receiver determined in the selection conditions is selected. This embodiment enables a data transfer method to be selected which supports data transfer according to the type of the identifier of the receiver or to a network according to the type of the identifier of the receiver.

BRIEF DESCRIPTION OF THE DRAWINGS

The invention is now described in closer detail in connection with some embodiments and with reference to the accompanying drawings, in which FIG. 1 generally shows a telecommunication system comprising a mobile communication network, and services thereof.

DETAILED DESCRIPTION OF THE INVENTION

In the following, a procedure according to an embodiment of the invention will be described by way of example and with reference to a GSM system and a third generation 3GPP system. The invention may, however, be applied to any telecommunication system wherein a need exists to select a data transfer method to be used for a message to be transferred. Another example whereto the invention may be applied is a terminal device comprising access means to a wireless local area network. The data transfer method selection according to the invention may be applied e.g. to a portable computer enabling messages to be transmitted therefrom using several different data transfer methods, for instance via a wired connection, a WLAN connection, a GPRS connection or a Bluetooth connection.

Figure 1:
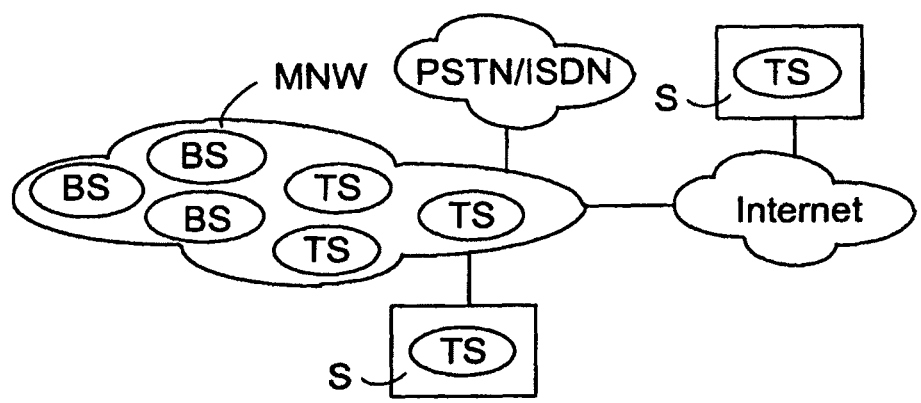

FIG. 1 generally illustrates a telecommunication system comprising a mobile communication S network MNW enabling data transfer to be arranged therefrom to the Internet and a PSTN network. The mobile communication network MNW provides mobile stations MS with several teleservices TS. Examples of such teleservices TS include a call setup service to a PLMN network, a data transfer service to the Internet, an SMS service, an MMS service, and a fax service. An element external to the mobile communication network MNW may also provide the mobile station MS of the mobile communication network MNW with teleservices TS, for instance such that a server S of an Internet access provider comprises an e-mail service. A teleservice TS may also be an end-to-end service wherein the mobile communication network only serves as one intermediary network. The mobile communication network MNW uses bearer services BS for data transfer between the mobile communication network MNW and a mobile station MS. Examples of bearer services BS include a circuit-switched call for data and voice transfer, or a PDP (Packet Data Protocol) context providing GPRS network packet-switched data transfer, and the data transfer protocols used by the same.

An example of the mobile communication network MNW is a third generation mobile communication system defined by the 3GPP (Third Generation Partnership Project) organization and called a 3GPP system or a UMTS system, wherein the main parts of the mobile communication system are a core network CN and a UMTS terrestrial radio access network UTRAN. The UTRAN typically comprises several radio network subsystems RNS, the interface therebetween being called an Iur (not shown). The RNS comprises a radio network controller RNC and one or more base stations, also known as node(s) B. A base station is responsible for implementing the radio path and the radio network controller RNC manages, the radio resources. A connection to the UMTS core network CN may also be provided via a GSM base station subsystem BSS or a GSM/EDGE radio access network (enhanced data rates for GSM evolution) GERAN. The core network CN comprises an infrastructure external to the UTRAN and belonging to the mobile communication system. In the core network, a mobile switching centre/visitor location register 3G-MSC/VLR is responsible for circuit switched calls and communicates with a home subscriber server HSS.

The 3GPP system also comprises a packet radio system implemented mainly according to a GPRS system connected to a GSM network. A UMTS packet radio system may comprise several gateway and serving GPRS support nodes and, typically, several serving GPRS support nodes SGSN are connected to one gateway GPRS support node GGSN. The task of the serving GPRS support node SGSN is to detect mobile stations capable of packet radio connections within its service area, to transmit and receive data packets from such mobile stations and to monitor the location of the mobile stations within its service area. The gateway GPRS support node GGSN serves as a gateway between the UMTS network packet radio system and an external packet data network. External data networks may be e.g. a 3GPP or a GPRS network of another network operator, the Internet, or a private local area network. A mobile communication network typically also comprises other functions (that can be implemented in separate network elements and/or in the already abovementioned network elements), such as an SMS centre, an MMS server, and SIP functions. 3GPP specifications define various network services between a mobile station and a core network, between a core network and a radio access network, and between a mobile station and a radio access network. The 3GPP specifications further define various service features (e.g. customized applications for mobile network enhanced logic CAMEL services), which may be utilized by various network services TS created by network operators. 3GPP systems support the following teleservices TS of the GSM system: voice service, fax service, circuit switched data, supplementary services, and unstructured supplementary service data USSD service. Also other kind of teleservices TS will be provided in 3GPP networks, e.g. Voice over IP VoIP.

Figure 2:
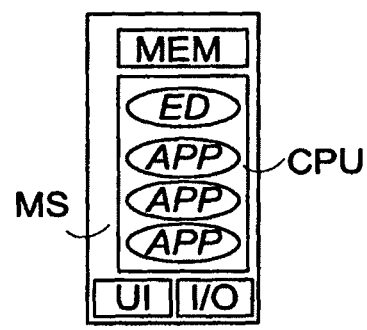
FIG. 2 shows a mobile station according to an embodiment.

As illustrated in FIG. 2, a mobile station MS comprises a memory MEM, a user interface UI, I/O means for arranging I/O data transfer, and a central processing unit CPU comprising one or more processors. Various applications APP may be implemented in the mobile station MS by executing, in the CPU, computer program code stored in the memory MEM. In order to enable at least some of the services BS, TS enabling message transfer in a mobile communication network MNW to be utilized by the mobile station MS, data transfer applications APP are implemented, typically by software, in the mobile station MS, the applications APP together with the network implementing the necessary negotiation, message packing and transmission to the mobile communication network MNW according to the data transfer protocol used. Examples of such applications APP include a circuit switched data transfer application, packet switched data transfer application, an SMS application, a WAP application, an MMS application, an enhanced messaging service EMS application, a fax application, and an e-mail application. Some of the above mentioned applications utilize the services of data transfer methods located lower in the protocol stack; for example, an e-mail application utilizes a packet switched GPRS service. Computer program codes executed in the central processing unit CPU may correspondingly enable the mobile station MS to implement also the inventive means relating to the selection of a data transfer method; some embodiments of such means are illustrated in connection with FIGS. 3, 4a and 4b.

According to an embodiment, the mobile station MS uses, in a centralized manner, a message editor ED configured to select the data transfer application to be used, e.g. one of the applications APP, to be used for transmitting a message generated in the editor ED. The computer program may be stored in any memory means, e.g. on a hard disk of a PC or on a CD-ROM disc wherefrom it may be downloaded into the memory MEM of a device MS executing the program. The computer program may also be downloaded via a network by using e.g. a TCP/IP protocol stack. It is also feasible to use hardware solutions or a combination of hardware and software solutions to implement the inventive means.

Figure 3:
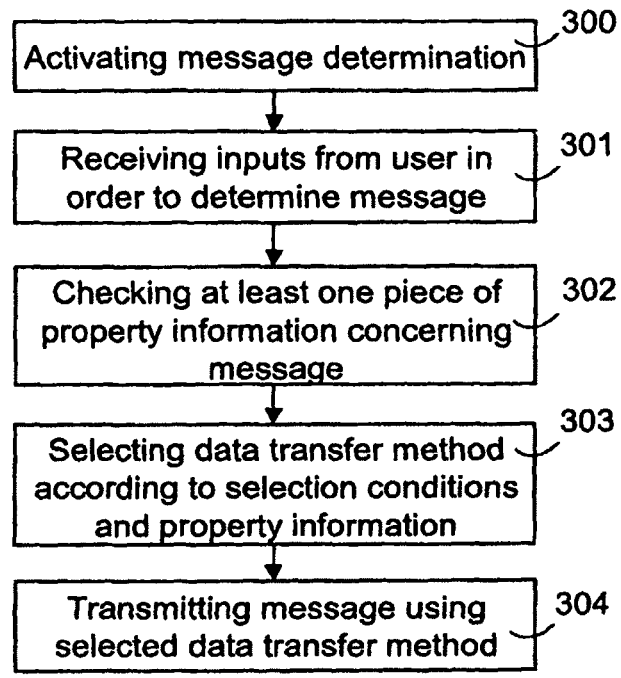
FIG. 3 is a flow diagram showing a method according to an embodiment.

FIG. 3 illustrates a method according to an embodiment for selecting a data transfer method, the method in the figure being particularly applicable to a mobile station MS; according to an embodiment, to the message editor ED. In the method, step 300 comprises activating message determination. For instance, a message editor ED may then be switched on, the input view of a message thus being shown to a user. Inputs are received 301 from the user, on the basis of which a message to be transmitted is determined. The user may enter information into the message e.g. by entering characters and/or selecting a piece of information stored in advance, e.g. by selecting a photograph stored in the memory MEM to be attached to the message.

In step 302, at least one piece of property information concerning the message being entered or already entered is checked. According to an embodiment, step 302 may be carried out when the user has entered the message and selected to transmit the message. Alternatively, step 302 may be implemented already while entering the message, e.g. when the user selects to add information of a predetermined information type to the message. Step 302 may be carried out when the user has selected and/or entered the receiver of the message.

In step 303, a data transfer method is selected according to predetermined selection conditions and according to determined at least one piece of property information. In the selection conditions, one or more data transfer methods are associated with the property information. The selection conditions may be implemented in many different ways, e.g. as a search table stored in the memory MEM. Different embodiments for implementing the selection conditions and for using different properties of a message for selecting a data transfer method will be shown in greater detail below. In step 303, the data transfer method associated in the predetermined selection conditions with the property information is thus selected in order to transmit the message. It is to be noted that the property information may be associated with a data transfer method also indirectly; for example such that a direct association is determined in the selection conditions between one data transfer method and one piece of property information while another data transfer method determined in the selection conditions is used for messages comprising other property information (which is not necessarily even mentioned in the selection conditions). If the selection conditions do not determine the data transfer method to be used for a piece of property information concerning a message, a mobile station MS may be configured to select a default data transfer method indirectly associated with the property information or ask the user to select the data transfer method to be used. The selection criteria may be determined in to the mobile station MS already while manufacturing the device but, according to an embodiment, the user may determine and/or change at least some of the selection conditions. If several data transfer methods are available to be used for transferring messages of a similar type, the user may preselect a default data transfer method, e.g. MMS messages instead of EMS messages. According to an embodiment, for example a network operator or another external party may change the selection conditions using e.g. a device management protocol. According to yet another embodiment, the selection conditions may determine that the data transfer method to be used is selected according to the data transfer method of a previously received message when a reply is provided to the message, i.e. the message to be transmitted is a reply message.

After the data transfer method has been selected, in step 304 the message is transmitted using the selected data transfer method, e.g. one of the data transfer methods mentioned above in connection with FIG. 1 or 2. When the method of FIG. 3 is applied to the message editor ED, it may transmit the message to an application programming interface API of an application APP supporting and implementing the selected data transfer method. Next, the application APP transmits the contents of the message according to the data transfer protocol it uses. The message editor ED may thus be shared by several messages according to different data transfer methods, e.g. messages to be transferred via an SMS service and an MMS service. According to an embodiment, the message editor ED may activate the selected data transfer application and/or service. For example, a PDP context or a WAP connection of a GPRS service may be set up in response to a need to transmit a message and its at least one property.

Figure 4A:
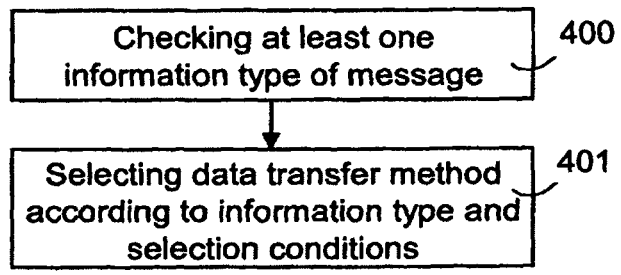
FIGS. 4a and 4b show how selection conditions are used according to some embodiments.

FIG. 4a illustrates how selection conditions are used according to an embodiment, the selection conditions determining the data transfer method to be used for different information types. One or more information types of information entered into and/or selected for a message are then checked 400. An information type thus refers to the format of information contained in a message; a message may thus comprise e.g. one or more of the following information types: text, modified text, still picture, video image, recording, calendar entry. In step 400, the data transfer method associated in the selection conditions with the determined one or more information types is selected 401 for transmitting the message. This embodiment enables a data transfer method to be always selected which supports the transfer of one or more information types of the information contained in the message. The selection conditions may e.g. determine that messages containing image files are always transmitted using an MMS service. Then, in step 400, it can be checked whether or not the message contains image files. The selection conditions may also determine conditions relating to several different information types, e.g. such that a message is always to be transmitted as an MMS message if it contains several information types.

The selection conditions may also determine conditions for the use of a particular data transfer method. For instance, the selection conditions may determine that if a message only contains text, it is transmitted as an SMS message, otherwise always as an MMS message. Furthermore, according to an embodiment, the selection conditions may determine in closer detail single information types and the data transfer methods used therefor. The selection conditions may determine e.g. the data transfer method to be used according to the files to be attached to a message, e.g. pictures in a JPEG format are transmitted as an MMS message whereas an e-mail application is used for pictures in a GIF format.

Figure 4B:
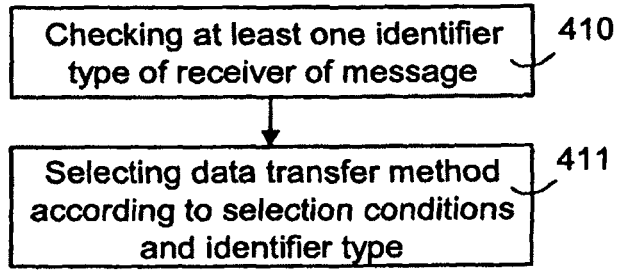

FIG. 4b illustrates how selection conditions are used according to another embodiment, the selection conditions determining the data transfer method to be used for the types of the identifier of the receiver. Then, in step 410, the identifier type of the receiver entered or selected by the user as the receiver of the message is checked. In step 411, the data transfer method which is associated with the identifier type of the receiver in the selection conditions and which supports the transfer of messages according to the determined type is selected. This embodiment enables a data transfer method to be always selected which supports data transfer according to the type of the identifier of the receiver or to a network according to the type of the identifier of the receiver.

According to an embodiment, the type of the identifier of the receiver is an IP address. The type may then be determined in step 410, when it is detected that the user has entered or is entering an IP address or a domain name describing an IP address. This type may be detected e.g. in step 410 on the basis of the @ character used in a-mail addresses or on the basis of a network address. Then, when it is detected that the type of the identifier is an IP address, the data transfer method associated therewith in the selection conditions may be used, e.g. a GPRS service based on IP data transfer. Furthermore, more detailed selection conditions may be used; for example, when the user enters an e-mail address, an e-mail service is selected as the data transfer method.

According to another embodiment, the type of the identifier of a receiver is a telephone number entered or selected by the user. Then, in step 410, it can be detected on the basis of the digits entered by the receiver that the number is a telephone number, and select 411 the data transfer method associated in the selection conditions with this type. This embodiment also enables more detailed selection conditions to be used; for example such that different data transfer methods are determined for different telephone numbers, or sets of numbers. According to an embodiment, the mobile station MS is configured to check whether or not the number is a mobile subscriber number. For instance, in a mobile station MS according to the GSM standard, it is thus possible to check the first 3 to 6 entered digits and thus, on the basis of a GSM numbering system country code CC and national destination code NDC, to determine whether or not the number of the receiver is a mobile subscriber number. The selection conditions of a mobile station MS may, particularly in connection with the use of an SMS service and an MMS service, determine that messages designated to a mobile subscriber number only are transmitted using these services.

According to yet another embodiment, the selection conditions determine the data transfer method to be used for the identifiers of different receivers. For example, contact information determines a default data transfer method contact-specifically. Then, when the contact information is searched for transmission information (an address or a telephone number), it is simultaneously checked whether or not a default data transfer method has been associated with the receiver information. Thus, the property information which has been determined in the selection conditions and on the basis of which the data transfer method is selected is, for example, a particular telephone number or an IP address. The selection conditions included in the contact information or stored separately may determine whether or not it is possible for the receiver to receive e.g. MMS messages. This embodiment thus enables a data transfer method to be predetermined which is always to be used for transmitting messages to the particular receiver or group of receivers.

The embodiments illustrated above may thus be applied in steps 302 and 303 of FIG. 3. It is to be noted that several different selection conditions may be applied or the selection conditions may determine several different criteria for selecting the data transfer method. For instance, the embodiments illustrated in both FIG. 4a and FIG. 4b may be applied to a message editor ED. It is also feasible that the selection conditions include a combination of at least two data transfer methods associated with property information, which is to be used for transmitting a message having the above property information. For example, an MMS application is selected (303; 401) for messages containing image files while MMS messages are transferred using a GPRS protocol.

According to an embodiment, the user is provided with information indicating available data transfer methods if, on the basis of the selection conditions, several data transfer methods are available for transmitting a message. The data transfer method to be used for transmitting the message is then selected on the basis of a response received from the user. This embodiment enables the user to be provided with a possibility to select a data transfer method, enabling the user to select e.g. the most inexpensive data transfer method as desired for transmitting the message. It is also possible to ask the user for an acknowledgement of an automatically selected data transfer method and to transmit the message only if the user acknowledges the use of the data transfer method.

It is obvious to one skilled in the art that as technology advances, the basic idea of the invention may be implemented in many different ways. The invention and its embodiments are thus not restricted to the above examples but may vary within the scope of the claims. Different features may thus be omitted, modified or replaced by equivalents.

That which is claimed:

1. A method comprising:
   determining a message to be transmitted over a network based on input received with a message editor from a user;
   receiving at least one piece of property information of the message;
   in the message editor, providing information indicating available data transfer methods for transmitting the message based on predetermined selection conditions and the property information;
   receiving an indication of a selection of at least one of the data transfer methods; and
   causing transmittal of the message from the message editor to a data transfer application associated with the selected method for transferring data.

2. A method as claimed in claim 1, wherein the property information identifies one or more information types of information in the message.

3. A method as claimed in claim 1, wherein the type of the identifier of the receiver entered or selected by the user as the receiver of the message is checked, and the data transfer method associated with the type of the identifier of the receiver determined in the selection conditions is selected.

4. A method as claimed in claim 1, further comprising, causing the message to be transmitted according to a data transfer protocol used by the data transfer application to a telecommunication network.

5. A method as claimed in claim 1, wherein at least one piece of property information is determined and the data transfer method is selected in response to receiving an input from the user in order to transmit the message.

6. A method as claimed in claim 1, wherein the user is provided with information indicating available data transfer methods in response to several data transfer methods being, on the basis of the selection conditions, available for transmitting the message, and the data transfer method to be used for transmitting the message is selected on the basis of a response received from the user.

7. An apparatus comprising at least one processor and a memory storing computer program code, the memory and computer program code being configured to, with the at least one processor, cause the apparatus to at least:
   determine a message to be transmitted over a network based on input received with a message editor from a user;
   receive at least one piece of property information of the message;
   in the message editor, provide information indicating available data transfer methods for transmitting the message based on predetermined selection conditions and the property information;
   receive an indication of a selection of at least one of the data transfer methods; and
   cause transmittal of the message from the message editor to a data transfer application associated with the identified method for transferring data.

8. An apparatus as claimed in claim 7, wherein property information identifies one or more information types of information in the message.

9. An apparatus as claimed in claim 7, wherein the memory and computer program code are further configured to, with the at least one processor, cause the apparatus to at least: check the type of the identifier of the receiver entered or selected by the user as the receiver of the message, and select the data transfer method associated with the type of the identifier of the receiver determined in the selection conditions.

10. An apparatus as claimed in claim 7, wherein the memory and computer program code are further configured to, with the at least one processor, cause the apparatus to at least: cause the message to be transmitted according to a data transfer protocol used by the data transfer application to a telecommunication network.

11. An apparatus as claimed in claim 7, wherein the apparatus is further caused to determine at least one piece of property information and select the data transfer method in response to receiving an input from the user in order to transmit the message.

12. An apparatus as claimed in claim 7, wherein the apparatus is caused to provide the user with information indicating available data transfer methods in response to several data transfer methods being, on the basis of the selection conditions, available for transmitting the message, and the terminal device is configured to select the data transfer method to be used for transmitting the message on the basis of a response received from the user.

13. A computer program product comprising a computer-readable non-transitory memory having computer program code portions stored therein, the computer program code portions being configured to, upon execution, cause an apparatus to at least:

determine a message to be transmitted over a network based on input received with a message editor from a user;

receive at least one piece of property information of the message;

in the message editor, providing information indicating available data transfer methods for transferring the message based on predetermined selection conditions and the property information;

receive an indication of a selection of at least one of the data transfer methods; and cause transmittal of the message from the message editor to a data transfer application associated with the identified method for transferring data.

\* \* \* \* \*